US009952352B2

(12) United States Patent
Kirby

(10) Patent No.: US 9,952,352 B2
(45) Date of Patent: Apr. 24, 2018

(54) DEVICE AND SYSTEM FOR GENERATING A WEATHER FORECAST FOR A SELECTED ZONE

(71) Applicant: U.S. Army Research Laboratory ATTN: RDRL-LOC-I, Adelphi, MD (US)

(72) Inventor: Stephen F. Kirby, Las Cruces, NM (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 304 days.

(21) Appl. No.: 14/866,153

(22) Filed: Sep. 25, 2015

(65) Prior Publication Data

US 2017/0090069 A1    Mar. 30, 2017

(51) Int. Cl.
*G01W 1/10* (2006.01)
*H04W 4/02* (2018.01)

(52) U.S. Cl.
CPC ............ *G01W 1/10* (2013.01); *H04W 4/02* (2013.01)

(58) Field of Classification Search
CPC ................................ G01W 1/10; H04W 4/02
USPC .......................................................... 702/3
See application file for complete search history.

(56) References Cited

U.S. PATENT DOCUMENTS

2013/0117608 A1   5/2013   Kirby
2014/0067270 A1   3/2014   Gail et al.
2014/0114624 A1   4/2014   Buchanan et al.

OTHER PUBLICATIONS

Duda, Michael, "The WRF Preprocessing System Overview and Installation," 2007 WRF-NMM Winter Tutorial. www2.nmm.ucar.edu.
Michalakes, J., "WRF Modeling System 'Short' Tutorial" NCAR/MMM. (references Version 3.0 released in Apr. 2008).
Michalakes, J., The Weather Research and Forecast Model Version 2.0,Mesoscale and Microscale Meteorology National Center for Atmospheric Research, Boulder, Colorado U.S.A., 11th ECMWF Workshop on Use of High Performance Computing in Meteorologye Oct. 25-29, 2004.

*Primary Examiner* — Bo Fan
(74) *Attorney, Agent, or Firm* — Lawrence E. Anderson

(57) ABSTRACT

A method and system configured to provide a weather forecast for a selected zone is provided. The method and system is configured to receive meteorological reports and locally sensed measurements. The information is transmitted to a weather model preprocessor disposed on the device which generates an analysis field. This information is passed to the weather model which is an executable program also disposed on the device. The weather model processes the analysis field generated by meteorological reports, large-scale initialization data and in-situ sensor values to generate an initial weather forecast. The weather model updates the initial weather forecast with real-time, high-resolution atmospheric measurements to generate a weather forecast more representative of the user's zone than that available from Internet/media outlets. Furthermore, because the weather model is run on the mobile device itself, staleness of the forecast will no longer be an issue, as forecasts can be generated on demand.

20 Claims, 12 Drawing Sheets

Programming Technique/Adaptation to Smart Phone

Operation Technique/Using Smart Phone/Tablet

DEVICE AND SYSTEM FOR GENERATING A WEATHER FORECAST FOR A SELECTED ZONE

STATEMENT OF GOVERNMENT INTEREST

The invention described herein may be manufactured, used, and licensed by or for the United States Government without the payment of royalties.

REFERENCE TO COMPUTER LISTING

A computer program listing which comprises an Appendix hereto is referred to hereinafter in the specification and has been provided electronically pursuant to 37 C.F.R. § 1.96(b). The Appendix is composed of a total of 21 files. The computer listing appendix and all files therein are hereby incorporated by reference in their entireties in the present specification.

TECHNICAL FIELD

Embodiments of the present invention generally relate to software applications and, more particularly, to a method and system for generating a weather forecast for a selected zone.

BACKGROUND OF THE INVENTION

Mobile devices having an application for providing a weather forecast are currently known and used. However, the weather forecast is based on temporally stale information. Specifically, the forecast is based upon a model that is typically run every 6 hours. Accordingly, the weather forecast information is based upon models that are not reflective of current atmospheric conditions.

Further, the weather forecast is based on global-scale models featuring coarse horizontal resolutions. For instance, current models used by forecasting entities may use a horizontal grid resolution of approximately 50-100 km for a forecast covering an area of 1000 km. Thus, current weather forecasts do not capture the influences of the local underlying topography and land use. Using global-scale models alone may suffice in non-dynamic weather conditions, but will typically be inadequate if weather conditions are changing rapidly or if the local area features significant terrain and/or dramatic land-use transitions.

Accordingly, it remains desirable to have a method or system configured to generate a weather forecast optimized for a local geographic zone by using a high-resolution (both horizontally and vertically) physics-based weather model with the best possible 3-d picture of the atmosphere for model initialization and by using built-in high resolution land use and topography datasets.

SUMMARY OF THE INVENTION

A preferred method and preferred embodiment system configured to provide a weather forecast for a selected zone is provided. The method and system may be implemented on a mobile device (such as a smartphone or tablet) having at least one processor for executing a local weather forecast application and a weather model. For example, a preferred embodiment cross-compiled version of the WRF model has been adapted to operate on an HTC One smartphone with no need for a remote server to execute the model.

The local weather forecast application is an executable program having a weather data application component. The weather data application is configured to receive information from a first weather source such as the Meteorological Assimilation Data Ingest System (MADIS) or the National Centers for Environmental Prediction (NCEP). Exemplary components of the weather data application are the Weather Research and Forecasting Preprocessing System (WPS) and the Weather Research and Forecasting Data Assimilation (WRFDA) packages. The first weather source provides surface reports, upper-air reports, and large-scale initialization data which covers a large geographic area. The preferred embodiment system includes a geographic input configured to select from one of a plurality of different sized zones surrounding the device. Each of the zones is smaller than the area covered by the initialization data.

The preferred embodiment system includes a weather model configured to receive information from the first weather source and the geographic input. The at least one processor executing the weather model so as to generate the weather forecast using information from the first weather source and the geographic input.

The system further includes a sensor unit configured to detect the current air temperature, atmospheric pressure and relative humidity. The sensor unit transmits the current air temperature, atmospheric pressure and relative humidity to the weather data application.

The weather model is in communication with the weather data application. The weather data application processes the surface reports, upper-air reports and initialization data from the first weather source and interpolates data from the first weather source so as to generate a snapshot/analysis field of meteorological conditions for the zone selected by the geographic input.

The at least one processor is further configured to execute the weather data application so as to process real-time atmospheric information detected by the sensor unit and generate an enhanced analysis field for the selected zone. The enhanced analysis field generated by the weather data application is then transmitted to the weather model. The at least one processor executes the weather model so as to process the enhanced analysis field to generate the forecast. Accordingly, as the forecast is generated by the weather model, the forecast is enhanced by assimilating real-time surface data from both the sensor unit and the first data source and upper-air data from the first data source.

A computer implemented method operable on at least one processor for providing a weather forecast for a selected zone is also provided. The method includes the step of inputting to at least one processor a local weather forecast application. The weather forecast application further includes a geographic input configured to select from one of a plurality of different sized zones centered on the geographic location of the computer.

The method includes the step of inputting into at least one processor data from a first weather source. The first weather source provides surface reports, upper-air reports, and large-scale initialization data. The geographic input is configured to select from one of a plurality of different zones, each zone is different in size from each other. The method includes the step of inputting into at least one processor large-scale initialization data and a current air temperature, atmospheric pressure and relative humidity, the at least one processor transmitting the large-scale initialization data and current air temperature, atmospheric pressure and relative humidity into the weather data application.

The method includes the step of inputting into at least one processor information obtained from a second weather source, such as a drone equipped with meteorological sensors or a weather balloon. The second weather source provides both a vertical and horizontal profile of atmospheric conditions within the selected zone. The weather data application processes information from the second weather source, the first weather source, the sensor unit and the geographic input so as to generate an enhanced analysis field, to be used by the weather model, for the selected zone. The weather model processes the enhanced analysis field to generate a weather forecast and then dynamically updates the weather forecast using new data from both the first weather source, the second weather source, and the sensor unit.

The computer may be a handheld portable device having a first transceiver configured to receive signals from the second weather source. In such an instance the second weather source includes a drone or a weather balloon. The drone or weather balloon includes a second transceiver and an atmospheric sensor unit configured to detect atmospheric conditions. Thus, the second source may be configured to provide real-time atmospheric conditions at various elevations so as to improve the accuracy of the weather forecast.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION OF THE PREFERRED EMBODIMENTS

Figure 1:
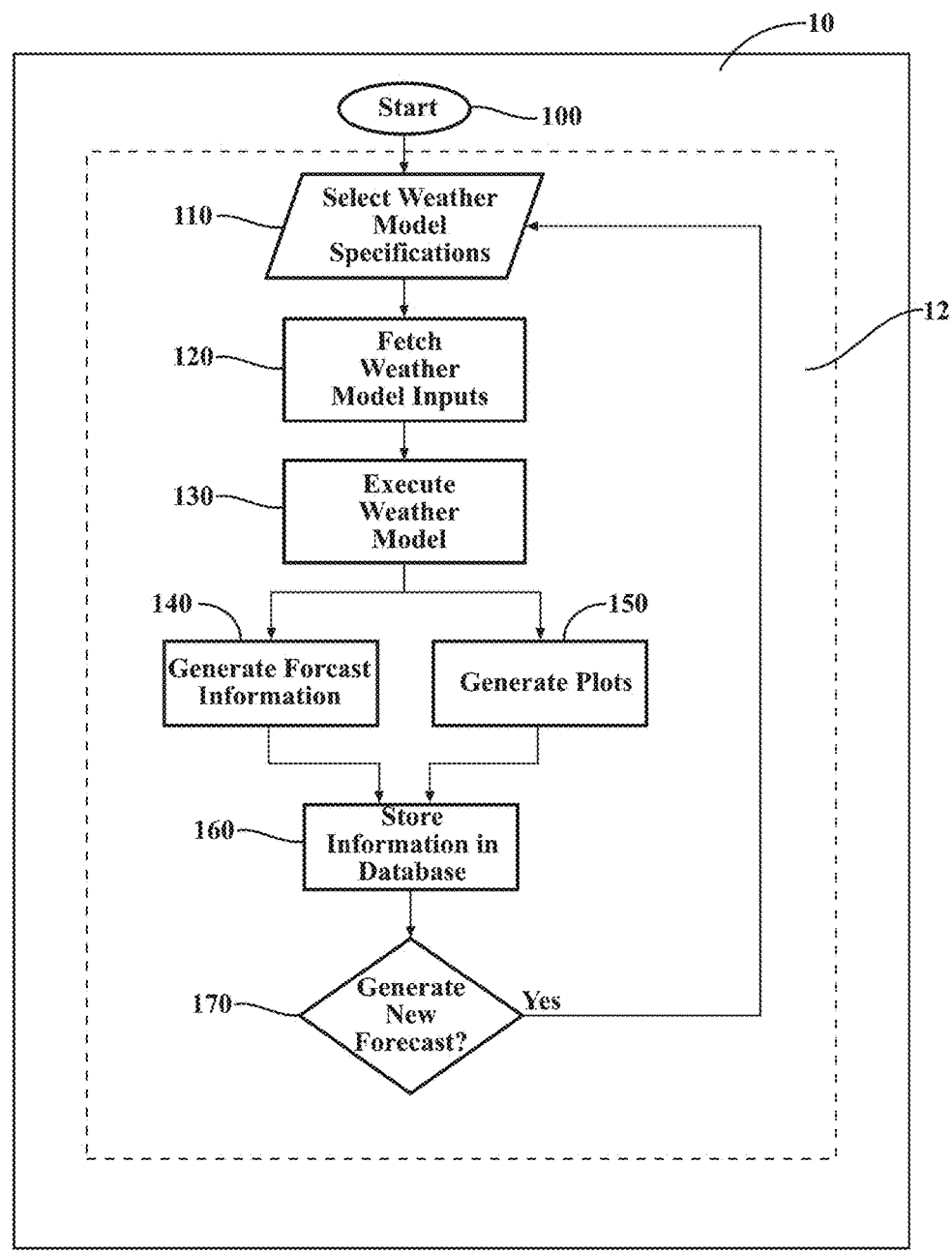
FIG. 1 is an illustrative view of a functional diagram of a preferred embodiment system.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second weather applications, these terms are only used to distinguish one application from another application. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The weather forecast application of the preferred embodiment of the present invention comprises 2 components: (1) The first component is the weather data application (i.e. the piece that transforms weather data mainly, so the WRF model can use it). This has 2 subparts: (i) Weather Research and Forecasting (WRF) Preprocessing System (or "WPS") which (a) takes geography data and reformats for the user grid and (b) takes gridded large-scale initialization data (using Global Forecast System (or "GFS") model data) and converts from its native Gridded Binary (or "GRIB") format to a format the WRF model can read. Reformats for the particular grid size. (ii) Weather Research and Forecasting Data Assimilation (WRFDA) (a) assimilates surface, upper-air observations, satellite data, etc. into WRF model.

(2) The second component is the weather model—using WRF. The details behind how WPS and WRF work are described in detail below. In order to get the WPS and the WRF to run on a smartphone such as the HTC One, which uses Android OS, the code must be "cross-compiled." The first step is to build a cross-compiler using GNU Compiler Collection (GCC). This allowed "cross-compiling" of the WPS code and the WRF code; both of which are in FORTRAN computer language. What this cross-compiler does is allow compilation of FORTRAN source code on an x86_64 architecture machine (such as a Linux OS system), and execution on an ARM architecture system (such as the HTC One smartphone using Android OS). Having cross-compiled WPS and WRF, one can process GFS data using WPS on the HTC One smartphone, then run the WRF model on the HTC One smartphone, generating 24 h of forecast output. Next is to cross-compile the WRF Data Assimilation (WRFDA) package so it can run on the HTC One smartphone. This will make it possible to assimilate surface reports, upper-air reports, satellite data, etc., into the WRF model. The present invention provides the capability of running a weather model (WRF or otherwise) on a smartphone (Android OS), based upon the cross-compiling of WPS and WRF. A preferred embodiment of the present invention provides for the assimilating into the weather model running in the palm of a person's hand (smartphone or tablet): (a) weather observations (temperature, pressure, relative humidity) using smartphone sensors (b) profiles of temperature, pressure, relative humidity, and winds taken by drone (or balloon). A drone would be preferable due to the reusability aspect and there is no extensive setup as there is with a balloon; the drone is ideally run by user locally, but doesn't necessarily have to be if the user can access the data. Data is transmitted by radio waves to user mobile device and assimilated into weather model running on smartphone (or tablet). A preferred embodiment builds this capability in hardware (instrumenting a small drone with weather sensors) and software. Given the data from (a) weather observations (temperature, pressure, relative humidity) using smartphone sensors and (b) profiles of temperature, pressure, relative humidity, winds taken by drone (or balloon), the user will have an accurate depiction of the atmosphere (at the surface and at upper-levels) in their vicinity. Having the most accurate initial analysis field is key to a more accurate forecast.

A preferred embodiment of the present invention further comprises cross-compiling WRFDA for its use on a mobile device (smartphone or tablet) to provide data assimilation into a weather model, running on a mobile device. The user could rapidly update the weather forecast for their location since (i) they can run the weather model right on their phone/tablet anytime, (ii) they can assimilate new weather observations from (i) Internet sources, (ii) their phone sensors or (iii) from instrumented drone at any time. So there is no need to wait for an updated forecast from Internet/media outlets.

A preferred embodiment configured to provide a weather forecast for a selected zone is provided. The zone may be on the order of 400000 square kilometers for the largest domain and 600 square kilometers for the smallest domain.

A preferred embodiment system may be implemented on a mobile device, such as a smartphone or tablet, having at least one processor configured to execute a local weather data application such as the Weather and Research Forecasting Preprocessing System (WPS). and a weather model such as the Weather and Research Forecasting (WRF) model. The local weather forecast application includes a weather data application component configured to receive data from a first weather source (e.g., Meteorological Assimilation Data Ingest System (MADIS), a meteorological observational database and data delivery system that provides observations that cover the globe, or the National Centers for Environmental Prediction (NCEP). The first weather source provides surface reports, upper-air reports, and large-scale initialization data which covers a geographic area larger than the selected zone. The surface reports, upper-air reports and large-scale initialization data are typically global in coverage.

The system may further include a geographic input disposed on the computer. An exemplary geographic input is a component of WPS which contains elevation data, land use data, etc., and is used to designate the model run area. The geographic input is configured to select from one of a plurality of different sized zones. The largest zone is approximately 400000 square kilometers and the smallest zone is approximately 600 square kilometers. Each of the zones are smaller than the area covered by the initialization data which is typically global in scope.

The system includes a preprocessing system (referenced also as the weather data application). The preprocessing system is configured to receive information from the first weather source, and the geographic input so as to generate an analysis field.

The processor executes the weather model so as to process the analysis field and generate an initial weather forecast. The weather model (one example being WRF which has a global community of contributors, but there are others, such as the Advanced Regional Prediction System (ARPS) developed by University of Oklahoma) is further configured to dynamically update the initial weather forecast by assimilating real-time data from the first and second weather data sources.

The weather model may be hosted on a mobile device featuring at least one processor. The mobile device may further include a sensor unit configured to detect local air temperature, atmospheric pressure and relative humidity. Temperature is sensed in a mobile device by noting how much the conductance changes in a semiconductor. For relative humidity determination, a hygrometer sensor in a mobile device detects changes in the flow of current due to changes in the moisture field surrounding the mobile device. Pressure is measured with a barometric sensor whereby when the sensor is squeezed by increasing air pressure, electric charge is generated. This is known as the piezoelectric effect. The sensor unit transmits the air temperature, atmospheric pressure and relative humidity to the preprocessor system. The preprocessing system processes the surface reports, upper-air reports and large-scale initialization data from the first weather source and interpolates data from the first weather source so as to generate an enhanced analysis field for the zone selected by the geographic input.

The weather model processes the enhanced analysis field and is further configured to process real-time atmospheric information such as ambient temperature, atmospheric pressure, and relative humidity detected by the sensor unit so as to generate the weather forecast for the selected zone ranging from 400000 square kilometers to 600 square kilometers. With the new real-time data, the device provides a high-resolution analysis field which initializes a weather model. The weather model proceeds to generate a high-resolution (on the order of a kilometer for the innermost domain) local initial weather forecast that accounts for the specific local meteorological conditions as well as the local terrain and land use. The weather model further processes real-time environmental data of the selected zone to provide a more precise local weather forecast relative to current forecasts.

With reference first to FIG. 1, a functional diagram of the preferred embodiment 10, which is an exemplary embodiment of the present invention. The preferred embodiment 10 may be operated from a computer 12, as indicated by the dashed lines. The preferred embodiment may be embodied in a computer also referenced herein as a handheld 12a such as a smartphone or tablet. The processor 14 is configured to execute a software program. In particular, the processor 14 may be configured to execute a local weather forecast application 16. A specific embodiment of the first part of the weather forecast application is the WPS, which reformats the input meteorological and geographic datasets, yielding an analysis field. The local weather forecast application 16 is configured to execute a weather model 16a. The weather model such as the WRF model may be written onto the computer 12. The computer 12 may be a portable handheld device 12a as shown in FIGS. 2, 3, 6 and 7.

The preferred embodiment 10 is initialized at block 100 and proceeds to block 110 wherein the system 10 is configured to select weather model specifications, such as the geographic location, forecast model grid size, forecast start time, and forecast period desired. The system 10 proceeds to obtaining weather model inputs required to generate the weather forecast, such inputs include (1) surface reports, upper-air reports, and large-scale initialization data, all obtainable from the National Centers for Environmental Prediction (2) local air temperature, atmospheric pressure and relative humidity sensed on the user's mobile device and (3) vertical and horizontal profiles of ambient temperature, atmospheric pressure, relative humidity, and winds obtained through the operation of in-situ platforms such as drones or weather balloons.

The preferred embodiment 10 proceeds to block 130 wherein the processor 14 executes the weather model 16a so as to process the weather model specifications and weather model inputs to generate a weather forecast. The first part of the modeling process is handled by a weather model "pre-processor", exemplified here by WPS. WPS involves 3 steps: (1) define the simulation domains, including computing latitude and longitudes for each grid point and interpolating various terrestrial data sets to the model grid. The WPS software and the accompanying terrestrial data sets are publically available. These terrestrial data sets include: soil categories, land use category, terrain height, annual mean deep soil temperature, monthly vegetation fraction, monthly albedo, maximum snow albedo, and slope and may be found in a publication entitled, "The WRF Preprocessing System: Overview and Installation", Michael Duda, 2007 WRF-NMM Winter Tutorial"; (2) convert the large-scale initialization data, exemplified herein as the GFS model, from its native Gridded Binary (GRIB) format to an "intermediate format". So-called "Vtables" (for Variable Tables) contain codes to identify the variables and levels in the GRIB file; and (3) Horizontally interpolate the intermediate-format meteorological data that are extracted in step (2) onto the simulation domains defined in step (1). For this step a so-called "METGRID.TBL" is referenced to determine the interpolation method to be employed. The next stage, in the case of the current model embodiment, WRF, involves these processes: (1) read meteorological and static input data from the (WPS), (2) prepare soil fields for use in the model (3) check to verify that soil categories, land use, land mask, soil temperature, sea surface temperature are all consistent with each other, (4) multiple input time periods are processed to generate the lateral boundary conditions, and (5) 3d boundary data (u, v, potential temperature, vapor mixing ratio, total geopotential) are coupled with total column pressure. These steps are handled by the WRF "real.exe" program. The WRF "wrf.exe" program generates the forecast output.

The WRF model is publically available. The particular version of the WRF model exemplified here is the WRF-Advanced Research WRF (ARW), with its own particular dynamic solver for doing computations with the atmospheric governing equations. Key features of WRF-ARW include: (a) 3rd-order Runge-Kutta time-split integration, (b) High-order positive-definite advection, and (c) Two-way interacting telescoping moving nests as shown in a publication entitled "WRF Modeling System 'Short' Tutorial" by J. Michalakes, J. Dudhia, W. Wang, C. Bruyere, M. Duda, D. Gill, W. Skamarock, NCAR/MMM (no date given), WRF Data Assimilation (WRFDA) is used to assimilate meteorological observations into WRF-ARW. The WRFDA program "obsproc.exe" converts, as an example, the MADIS netCDF format meteorological observations into a text format, capturing only observations within the user's designated area of interest (defined in a so-called "namelist" file, used as input to obsproc.exe). The preferred embodiment 10 may display the weather forecast in the form of textual information (shown in FIG. 7) or a weather plot (shown in FIG. 6).

The preferred embodiment system 10 proceeds to block 160 wherein the weather forecast information, i.e., all of the generated forecast fields, exemplified herein by WRF netCDF format forecast fields, are stored. The storage of this information allows users to subsequently generate graphical plots of the data, for example, forecasted surface winds, as well as generate textual forecast information. The preferred embodiment system 10 proceeds to block 170 wherein the user has the option of generating a new forecast, wherein the preferred embodiment system returns to block 110. Accordingly, the system 10 is configured to provide a weather forecast supplemented with local environmental data to include either: (1) local air temperature, atmospheric pressure and relative humidity sensed with mobile device sensors or external sensors or (2) in-situ vertical and horizontal profiles of meteorological data transmitted by airborne instruments.

Figure 2:
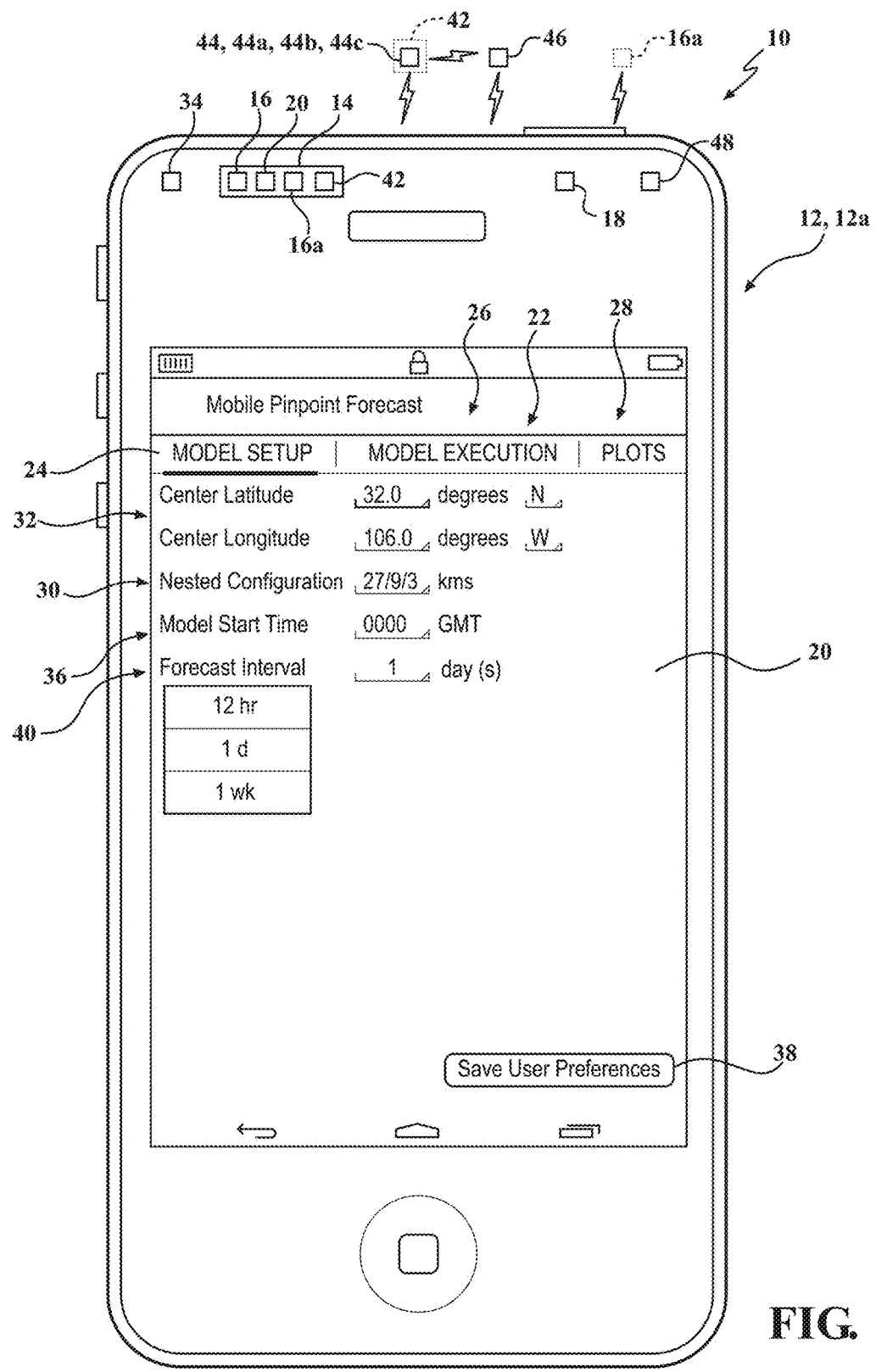
FIG. 2 is an illustrative view of a preferred embodiment showing the setup tab.
Figure 3:
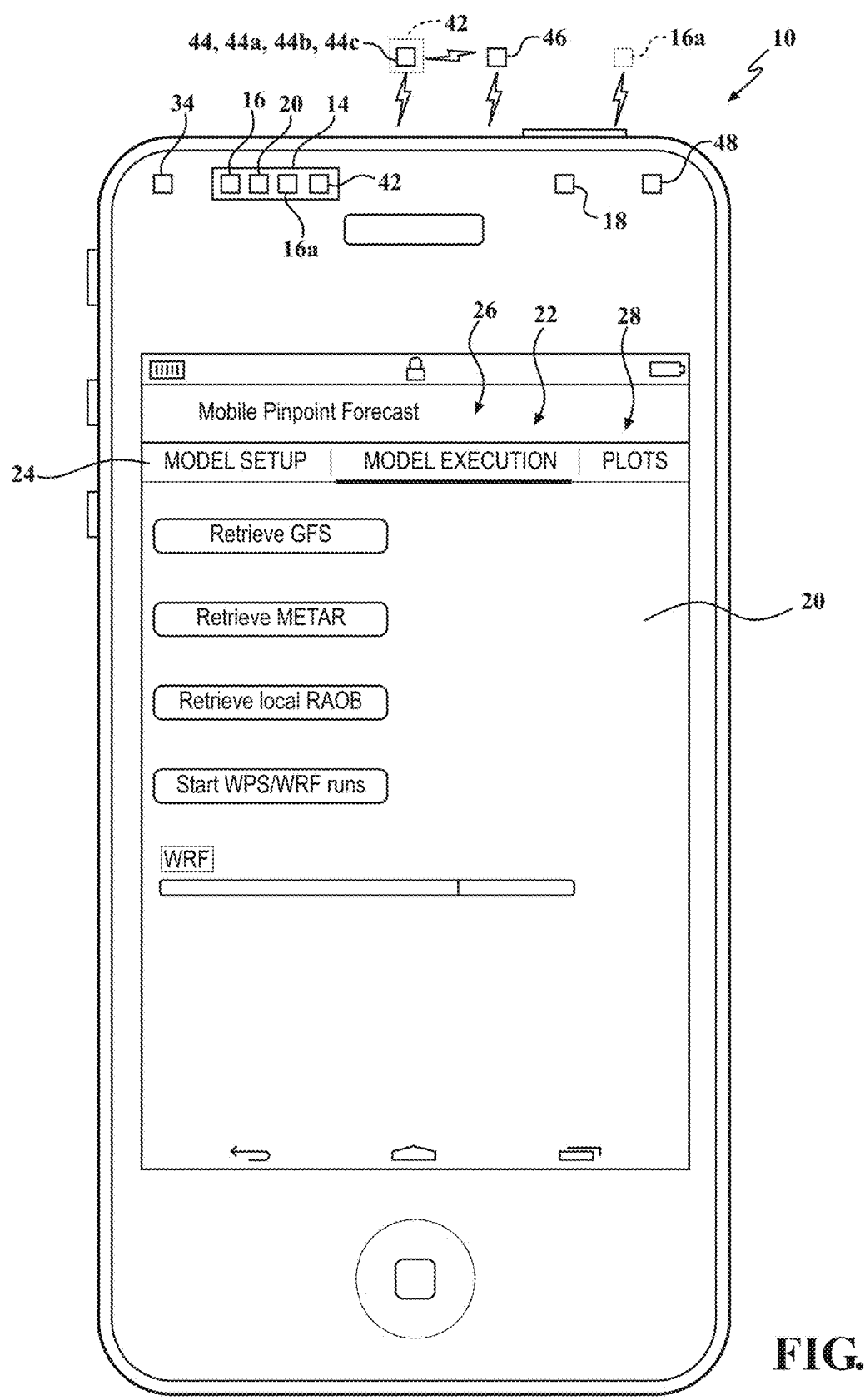
FIG. 3 is an illustrative view of a preferred embodiment showing the weather data and weather model application.
Figure 4:
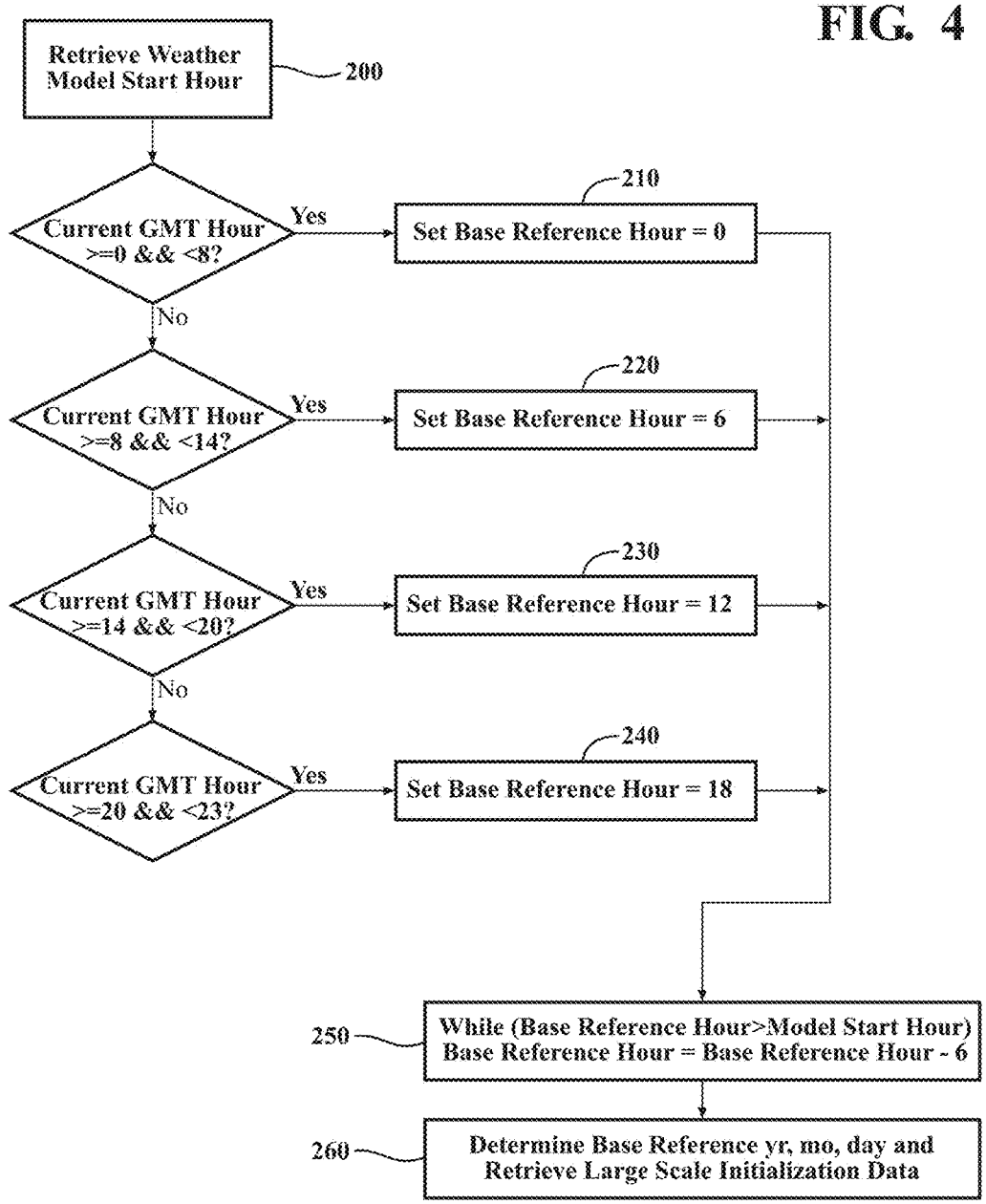
FIG. 4 is a flowchart of the process for determining what large-scale initialization data should be retrieved.

With reference to FIGS. 2-4, an illustrative view of system 10 executed on a smartphone or tablet is provided. The computer 12 is configured to provide a weather forecast (shown in FIGS. 6 and 7) for a selected zone. The computer 12 is shown as being embodied in a hand-held mobile phone 12a commonly referred to as a smartphone. However, it should be appreciated that the computer 12 may be embodied in a tablet or a smartwatch, given adequate on-board memory and processing capability or a similar mobile device.

The computer 12 includes at least one processor 14 configured to execute programmable software and/or software applications. The computer 12 includes a first transceiver 18 configured to receive and transmit signals through a wireless network such as 4g. From Wikipedia: "the spread spectrum radio technology used in 3G systems, is abandoned in all 4G candidate systems and replaced by OFDMA multi-carrier transmission and other frequency-domain equalization (FDE) schemes, making it possible to transfer very high bit rates". An advance to $5^{th}$ generation telecommunication standard (5g), i.e. even faster, may be expected in the next few years. The computer 12 includes a display 20. The display 20 provided by a smartphone or tablet may be a touch screen configured to detect a tactile input of the user's finger.

The computer 12 includes local weather forecast application 16 which is an executable program having a menu 22. The menu 22 includes having multiple options which may be displayed in a drop down menu 22. The menu 22 includes a setup tab 24, a weather data application tab 26 (referenced as "Model Execution"), and a forecast tab 28 (referenced as "Plots"). The local weather forecast application 16 is programmed onto the computer 12.

With reference now to FIG. 2, the setup tab 24 includes a geographic input 30 configured to select from one of a plurality of different sized zones surrounding the computer 12. For illustrative purposes, the different sized square zones are shown as (27 km/9 km/3 km); or may also be (3 km/1 km/0.33 km). The zone is defined by the horizontal resolution of an outer domain, an intermediate nest within the outer domain and an innermost nest. Accordingly, one option has a zone defined by an outer domain having 27 km horizontal resolution, an intermediate nest having a 9 km horizontal resolution and an inner nest having a 3 km horizontal resolution. The outer grid in the current instantiation is 25 points by 25 points. Given a user selection of a 27 km outer grid resolution, yields a length of 648 km for each side of the domain or a total area of 419904 square kilometers.

The setup tab 24 may further include a location input 32. The location input 32 is configured to provide the location of the zone. One of the location inputs 32 is the geographic location of the computer 12. The geographic location of the computer 12 may be determined by a location detection unit 34 such as a global positioning system. The location input 32 may be further configured to receive the selected zone 14 entered by the user by tapping on the "Model Setup" tab and entering a "Center Latitude" value and a "N/S" hemisphere value and a "Center Longitude" value as well as a "E/W" hemisphere value. Thus, the selected zone 14 is defined by (1) the location of the zone center as determined by GPS but may be overridden by the user inputting a latitude and longitude value and (2) the nesting configuration selected by the geographic input 30.

The setup tab 24 may further include a time input 36. The time input 36 may include a plurality of times for weather model start, i.e., if the user selects 0000 GMT, the first forecast output will be valid for 0000 GMT. The menu 22 may further include a user preference input 38 (referenced as "Save User Preferences") configured to save the different sized zone, location and time selected by the user so as to allow the user to generate subsequent weather forecasts 12 (shown in FIG. 6). FIG. 2 shows a weather forecast for a selected zone centered at 32 degrees north latitude, 106 degrees west longitude with an outer domain of 27 km, 9 km intermediate nest and a 3 km innermost nest, with model start at 0000 GMT.

The setup tab 24 may further include a forecast interval input 40. The forecast interval input 40 may be a drop down menu displaying a plurality of intervals of time for which the weather forecast 12 may run. For instance, the weather model 12 may be set to generate a forecast for a 12 hour, 1 day, or one week interval.

With reference now to FIG. 3, an illustrative view of the weather data application tab 26 is provided. The setup tab 24 provides the configuration data for the weather forecast (shown in FIG. 6). The weather data application tab 26 is configured to execute the local weather forecast application 16. The local weather forecast application 16 is configured to provide information to a weather model 16a so as to generate a forecast using the selected menu items.

The local weather forecast application 16 includes a weather data application segment 42 which is executed when the weather data application tab 20 is selected. The weather data application 42 processes meteorological information, for example, but is not limited to, surface and upper-air reports, satellite-derived wind information, aircraft reports available from MADIS to generate an analysis field. The meteorological information may be obtained from a first weather source and a second weather source. For instance, the weather data application segment 42 may be a preprocessing system commonly known as WRF Preprocessing System.

The first weather source 44 includes surface reports 44a from MADIS, upper-air reports 44b from MADIS and large-scale initialization data 44c from NCEP. The first weather source 44 may be provided from a remote server and transmitted to the preferred embodiment 12 over a wireless network. Any first weather source 44 currently known and used in the art may be adapted for use herein, illustratively including NCEP, which supplies the Global Forecast System, ("GFS"). The GFS may serve as the large-scale initialization data. It should be appreciated by those skilled in the art that the large-scale initialization data from the first weather source 44 may be stale in light of the fact that the GFS model, for example, is run at NCEP every 6 hours, starting at 0000 GMT. For use herein, the term "large-scale initialization data" refers generally to a global forecast system.

As described above, the first weather source 44 is configured to provide surface reports 44a, upper-air reports 44b, and large-scale initialization data 44c. It should be appreciated that the first weather source 44 will provide the latest information to the weather data application 42, and in some instances that information may be up to six hours old.

The weather data application 42 may be further configured to obtain meteorological information from a second weather source 46. The second weather source 46 provides current local temperature, pressure, relative humidity, as well as information regarding winds to the weather data application 42 to create the initial analysis field, but may also be used by the weather model to dynamically fine-tune the forecast. The second weather source 46 may be a drone or weather balloon having sensors configured to detect surface and upper air conditions in real-time. Accordingly, it should be appreciated that information from the second weather source 46 may not be available in instances where either a drone or weather balloon is not available in a selected zone 14 or their data footprint lies outside, for example the smallest domain possible, 576 square kilometers. Weather balloons are launched, in the U.S., typically at 0000 GMT and 1200 GMT, so there is also a potential issue of staleness even if weather balloon data is available. If weather balloon data is not available within the domain, the user will be notified when they tap the "Retrieve local RAOB" button. Although not always possible, a user-supplied drone, equipped with meteorological sensors, can supply a real-time atmospheric profile to the WRFDA component. When balloon data isn't available, the user will be relegated to the upper-air data within the GFS grids; which can be substituted/supplemented with drone data but this won't be the case in general.

With reference now to FIG. 4, a flow chart showing an exemplary embodiment of the process for determining which large scale initialization grids to fetch 44c is provided. The system 10 generates a forecast by processing large-scale initialization data 44c for a specific period of time. In this example, the large-scale initialization data 44c, exemplified herein as GFS, is provided by NCEP which updates the large-scale initialization data every six hours. The preferred embodiment system 10 is configured to processes the latest large-scale initialization data 44c.

At block 200, the system 10 requests a base reference hour for the weather model 16a, wherein the initial setting of base reference hour for the GFS model 44c may be obtained from one of four options shown in blocks 210, 220, 230 and 240 respectively. Blocks 210, 220, 230 and 240 show that the base reference hour is determined by the current time, and assigned a value of either 0, 6, 12 or 18 based upon the current time. For example, if the current time is 1200 GMT, the base reference hour is set to 6.

The process proceeds to block 250 wherein the base reference hour is subtracted by six (6) in instances where the base reference hour is greater than the model start time. This continues for as long as the base reference hour is greater than the model start hour. For example, if the model start hour is 1200 GMT, and the base reference hour is determined to be 1800 GMT, based on current GMT hour, 6 h would be subtracted from the base reference hour, since it is initially greater than the model start hour. Block 260 shows the process proceeding to the step of retrieving the large scale initialization data utilizing the "Download Manager" utility in java to retrieve the GFS, in the system's current instantiation, from NCEP.

Figure 5:
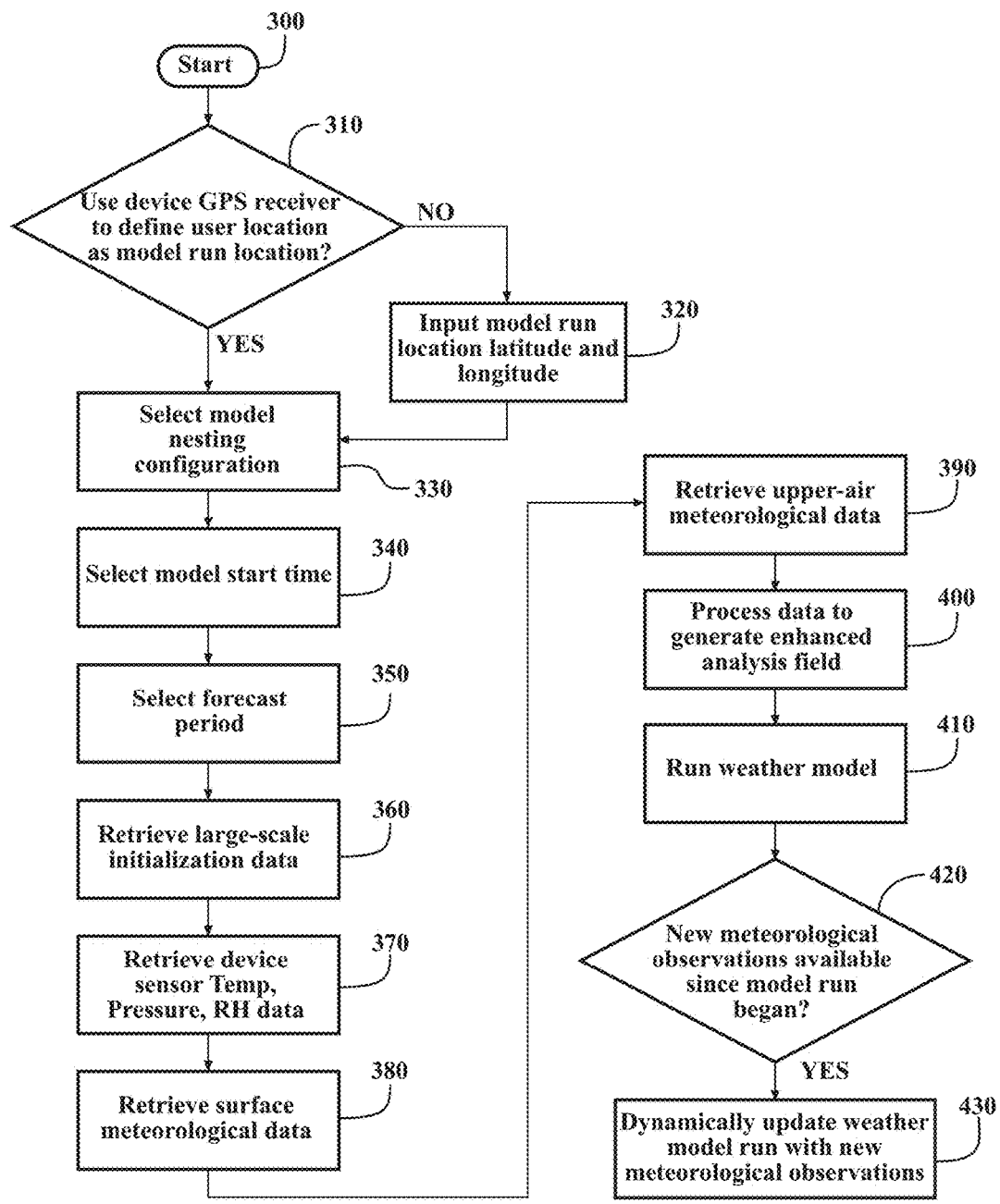
FIG. 5 is a diagram showing the operation of a preferred embodiment system.

With reference now to FIG. 5, a diagram showing the operation of the system 10 is provided. It should be appreciated that FIG. 5 provides the operation of the system 10, and should be viewed in conjunction with FIGS. 2 and/or 3 which point out the components of the system 10. As discussed above, the system 10 is implemented on a computer 12. The computer may include a location detection unit 34 such as a GPS receiver. The operation begins with block 300 wherein the computer 12 is turned on.

The operation proceeds to block 310 wherein the location detection unit 34 may be actuated so as to provide the location for which the weather model 16a is executed. Alternatively, as shown in block 320, the user may manually input the location using the location input 32. The operation proceeds to block 330 wherein the nesting configuration is established, wherein the geographic zones of the weather forecast are defined. FIG. 2, provides an exemplary embodiment of the nesting configuration. In particular, the setup tab 24 includes a geographic input 30 configured to select from one of a plurality of different sized zones surrounding the computer 12.

The operation of the system 10 proceeds to blocks 340 and 350 wherein the start time and period of the weather model 16a is provided. As discussed above, and shown in block 360, the large-scale initialization data 44c is retrieved based off of the model start time. Blocks 370-400 show the step of obtaining data processed by the weather model 16a. It should be appreciated by those skilled in the art that the data may be obtained in no particular order. Block 370 shows current meteorological data retrieved by the second weather source 46. In particular, the system 10 processes real time temperature, pressure and relative humidity. Block 380 shows data retrieved by the first weather source to include pre-prepared reports from MADIS such as surface reports 44a and upper-air reports 44b. Block 400 shows that the data is processed so as to generate the enhanced analysis data field.

The system 10 proceeds to block 410 wherein an initial weather forecast model is generated using WPS, WRFDA, and WRF As described above, the enhanced analysis data field may be generated by the weather data application so as to generate an initial weather forecast. In block 420, the weather forecast model is updated with new meteorological observations available since the initial weather forecast model was generated. These observations can originate from either a data provider such as MADIS or from airborne devices equipped with meteorological sensors.

In one aspect of the invention, the computer 12 further includes a sensor unit 48. (shown in FIGS. 2 and 3) This sensor unit 48 may consist of sensors inside the mobile device such as a smartphone or may be a set of sensors external to the mobile device. The sensors are configured to detect the air temperature, atmospheric pressure and relative humidity. Any such sensor unit 48 currently known and used in the art may be adapted for use herein. For external sensors, they can include a thermocouple, thermistor or an infrared sensor for detecting air temperature or dielectric material formed of a thermos-set polymer, thermoplastic polymer for detecting relative humidity. The external atmospheric pressure sensor mimics the internal mobile device sensor, in that increasing atmospheric pressure on the sensor will induce electrical charge, which is converted to a pressure reading. The sensor unit 48 transmits the air temperature, atmospheric pressure and relative humidity to the preprocessing system so as to generate an updated analysis data field. The weather model 16a processes the enhanced analysis data field generated by the weather data application so as to generate an initial weather forecast. The weather model 16a is further configured to process information from the sensor unit 48 to update the initial weather forecast so as to generate a local weather forecast 12 (shown in FIG. 4) for the selected zone 14. Accordingly, the local weather forecast 12 is relatively more accurate as real-time meteorological information is used, including in-situ measurements. Without current data values toward which a forecast can be nudged, forecasted parameter values will tend to drift from truth, as evidenced by the fact that longer-term forecasts are less accurate. With the additional ability to ingest meteorological readings from a mobile device, such as a smartphone, or from an autonomously controlled drone into the forecast, a more accurate analysis field will be depicted, and this is key to a more accurate forecast.

Preferably the weather model 16a is a physics-based weather model. Any such weather model 16a currently known and used in the art may be adapted for use herein illustratively including the Weather Research and Forecasting model (WRF). The weather data application transmits to the weather model 16a the selected zone 14, the time and the location of the local weather forecast 12, as well as the air temperature, atmospheric pressure and relative humidity. The weather model preprocessor, currently instantiated as WPS, 16*a* interpolates geographical data to the local domain, extracts meteorological fields from the large-scale initialization data, and assimilates in-situ measurements and weather reports to generate an initial analysis field for a selected zone 14. The weather model 16*a* is further configured, by way of user input of a desired forecast interval, to process a selected period of time so as to generate a weather forecast 12 for the selected period of time.

Figure 6:
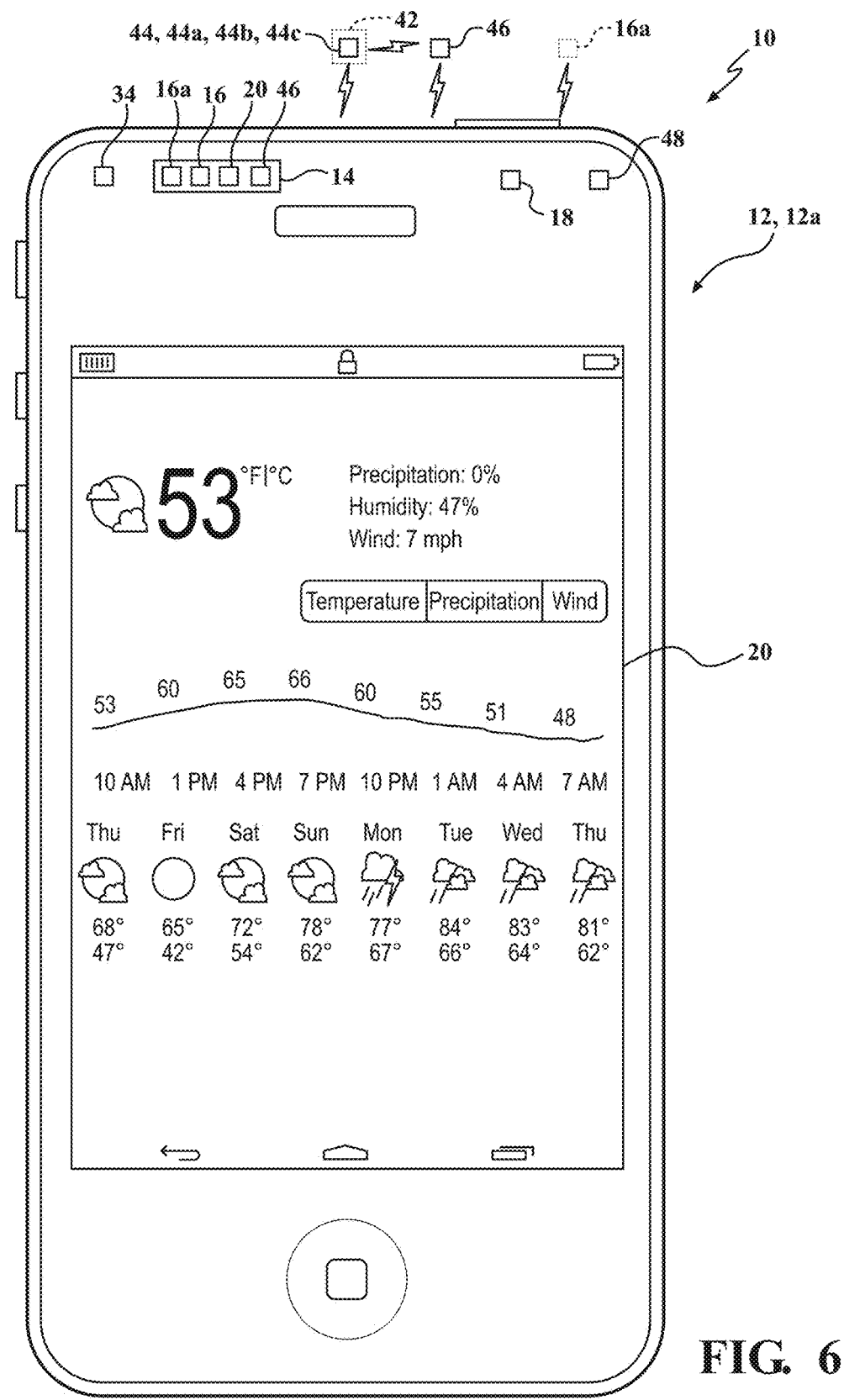
FIG. 6 is an illustrative view of a plot of a weather forecast; (delete bottom center button)
Figure 7:
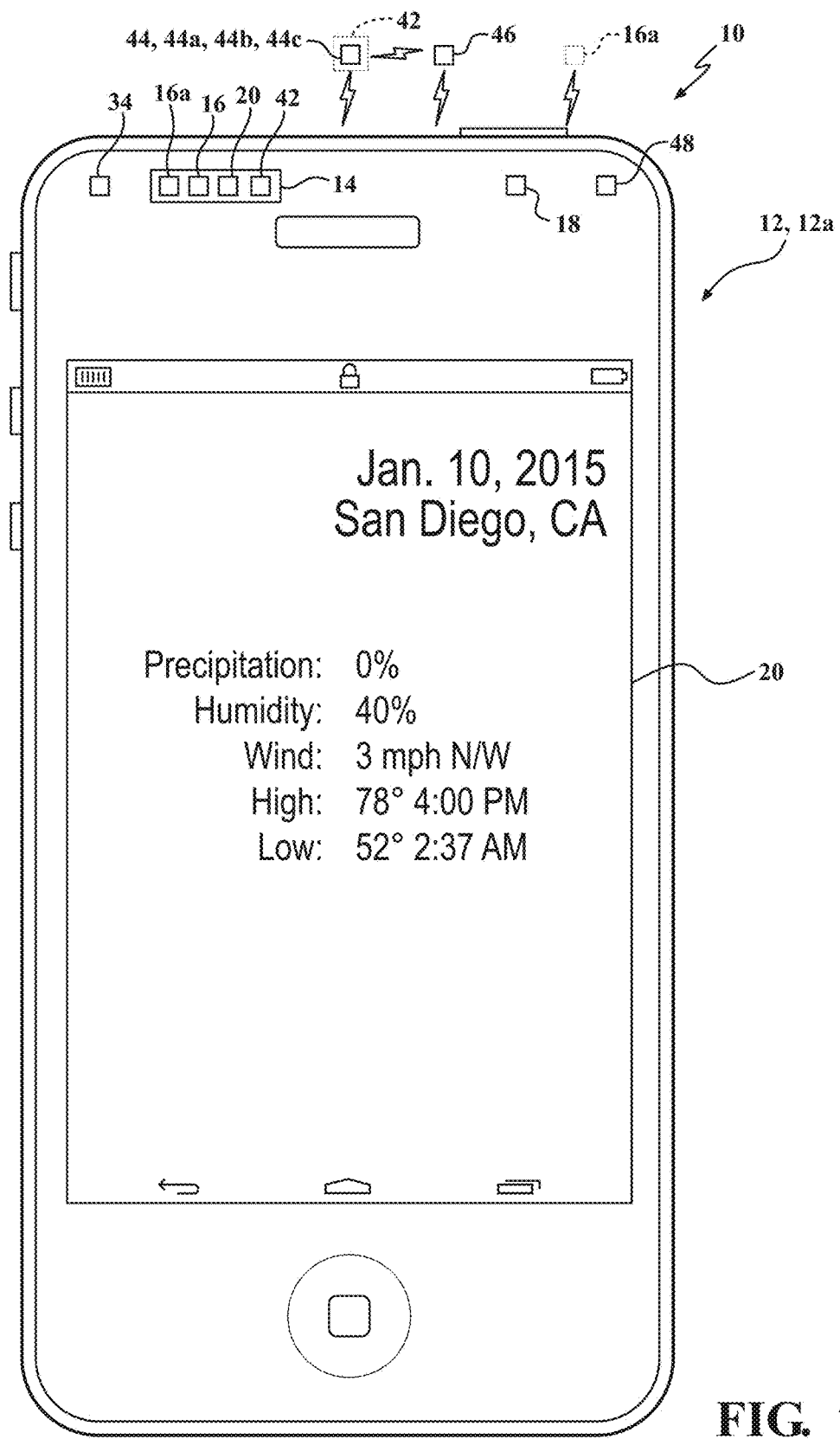
FIG. 7 is an illustrative view showing textual information relating to the weather forecast; (delete bottom center button)

With reference now to FIG. 6, a depiction of a weather forecast 12 is provided. The weather forecast 12 is calculated by the weather model 16*a* and is based upon selected zone 14, and the selected period of time. The weather forecast 12 is shown displayed on tab labeled "Plots." The weather model 16*a* may be further configured to process cross-section plots to delineate for example, winds and potential temperature. FIG. 7 is an illustrative view of the textual display having information relating to the weather forecast 12.

Figure 8:
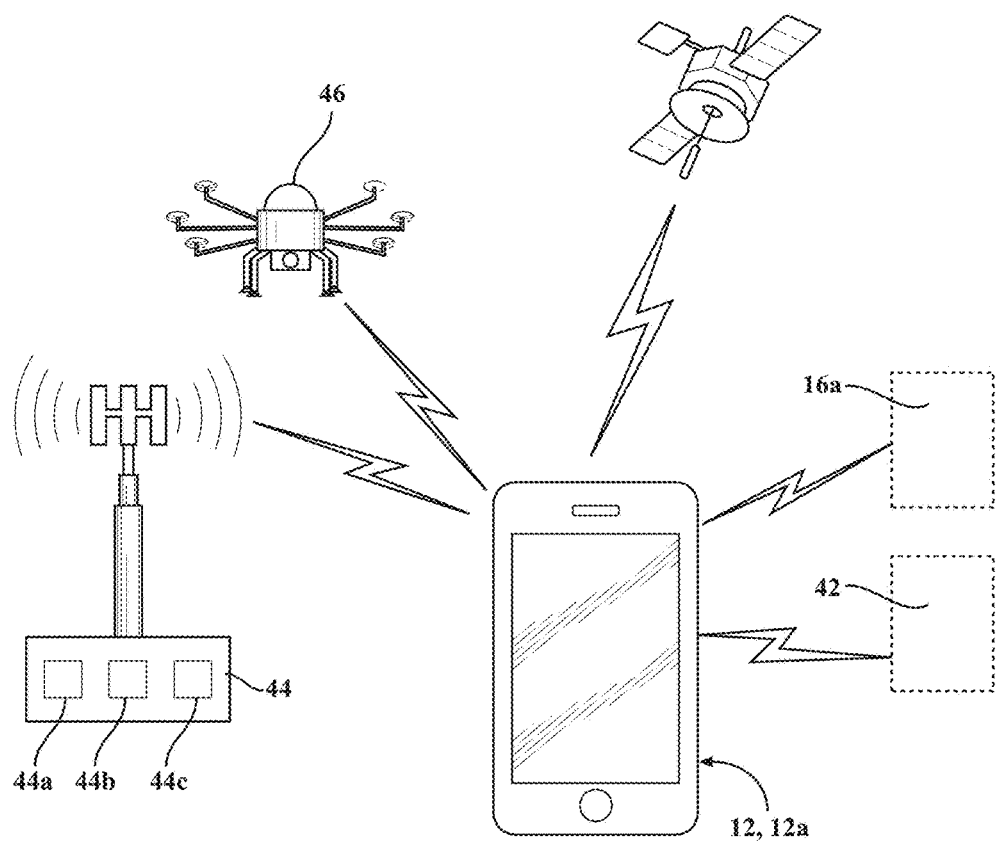
FIG. 8 is an exemplary diagram of a preferred embodiment system.

With reference now to FIG. 8 an exemplary diagram of the preferred embodiment 10 is provided. It should be appreciated that the diagram of the system shown in FIG. 8 should be viewed in conjunction with FIG. 2 or 3 which point out the components of the system 10. The system 100 includes a computer 12 having a processor 14 configured to execute a local weather forecast application 16, a sensor unit 48, and a first transceiver 18. The local weather forecast application 16 is an executable program having a menu 22 (see FIG. 1). The menu 22 includes having multiple options which may be displayed in a drop-down menu. The menu 22 includes a setup tab 24 (see FIG. 2), a weather data application tab 26 (see FIG. 2), and a forecast tab 28 (see FIG. 2). The local weather forecast application 16 instantiated currently as WRF, is programmed onto the computer 12.

The setup tab 24 includes a geographic input 30 configured to select from one of a plurality of different sized zones surrounding the computer 12. For illustrative purposes, the different sized zones are shown as (27 km/9 km/3 km); and (3 km/1 km/0.33 km). The zone is defined by the horizontal resolution of an outer domain, an intermediate nest within the outer domain and an innermost nest. Accordingly, one option has a zone defined by an outer domain having 27 km horizontal resolution, an intermediate nest having a 9 km horizontal resolution and an inner nest having a 3 km horizontal resolution. For grid nesting in meteorological domains, telescoping down by a factor of 3 is typical.

The setup tab 24 may further include a location input 32. The location input 32 is configured to provide the location of the zone. One of the location inputs 32 is the geographic location of the computer 12. The geographic location of the computer 12 may be determined by a location detection unit 34 such as a global positioning system. The location input 32 may be further configured to receive the selected zone 14 entered by the user. Thus, the selected zone 14 is defined by both the location of the zone and the area selected by the geographic input 30.

The setup tab 24 may further include a time input 36. The time input 36 may include a plurality of times for which the weather forecasting begins. The menu 22 may further include a user preference input 38 configured to save the different sized zone, location and time selected by the user so as to allow the user to generate subsequent weather forecasts 12. FIG. 1 shows a weather forecast 12 for a selected zone 14 centered at 32 degrees north latitude, 106 degrees west longitude with an outer domain of 27 km, 9 km intermediate nest and a 3 km innermost nest, and started at 0000 GMT. Thus, the setup tab 24 provides the setup for the weather forecast 12.

The sensor unit 48 is configured to detect the air temperature, atmospheric pressure and relative humidity. Any such sensor currently known and used in the art may be adapted for use herein, illustratively including, for an external sensor setup: a thermocouple, thermistor or an infrared sensor for detecting air temperature or dielectric material formed of a thermos-set polymer, thermoplastic polymer for detecting relative humidity or a semiconductor material, which when subjected to increased/decreased atmospheric pressure, induces a change in the electrical charge. For sensors that are internal to a mobile device such as a smartphone, temperature is sensed by noting how much the conductance changes in a semiconductor. For relative humidity determination, a hygrometer sensor in a mobile device detects changes in the flow of current due to changes in the moisture field surrounding the mobile device. Pressure is measured with a barometric sensor whereby when the sensor is squeezed by increasing air pressure, electric charge is generated. This is known as the piezoelectric effect.

The system further includes a weather data application 42, instantiated currently as the WPS and WRFDA and is configured to process information from the first and second weather sources 44, 46, so as to generate an analysis field. The analysis field is processed by the weather model 16*a* to generate an initial weather forecast. The weather model 16*a* is further configured to process information from the sensor unit 48 so as to generate an enhanced analysis field, leading to an optimum local weather forecast 12 for the selected zone 14.

The first weather feed includes surface reports 44*a*, upper-air reports 44*b*, and large-scale initialization data 44*c*. The first weather source 44 may be provided from a remote server and transmitted to the computer 12 over a wireless network. Any first weather source 44 currently known and used in the art may be adapted for use herein, illustratively including NCEP or the Meteorological Assimilation Data Ingest System ("MADIS"). GFS model data from NCEP may serve as the large-initialization data. According to Wikipedia, the Global Forecast System (GFS) is a global numerical weather prediction system containing a global computer model and variational analysis run by the United States' National Weather Service (NWS). The mathematical model is run four times a day, and produces forecasts for up to 16 days in advance, but with decreased spatial resolution after 10 days. The forecast skill generally decreases with time (as with any numerical weather prediction model) and for longer term forecasts, only the larger scales retain significant accuracy.

The first weather source 44 is configured to provide surface reports 44 and upper-air reports 44*b* from around the world that are aggregated by MADIS, and made available in netCDF format. The hourly surface reports are often from airports while the majority of the upper-air reports, at least in the U.S., are from balloon-borne instruments, taken at 0000 GMT and 1200 GMT by the National Weather Service. The surface reports are supplemented, in the U.S., by the numerous mesonet networks, for example, those in Texas, Oklahoma, etc. The first weather source also provides the large-scale initialization data 44*c*—currently GFS is used. The large-scale initialization data used herein, the GFS model, is typically run at six hour intervals beginning at 0000 GMT. Thus, it should be appreciated that in some instances the first weather source 44 provides large-scale initialization data that may be almost six hours old. The first weather source 44 provides such information from a third party server such as one available from NCEP, The system further includes a second weather source 46. The second weather source can be data supplied by an instrumented drone or balloon-borne instruments. Both of these platforms transmit their data to a ground receiver via radio frequency and are subsequently ingested by the weather data application. National Weather Service balloons travel up to 35 km. Drones, while unable to reach as high, are under the control of the operator, and thus can be utilized to provide a profile of the user's choice. The second weather source 46 provides a vertical and horizontal profile of atmospheric conditions within the selected zone 14. In particular, the second weather source 46 may provide the vertical and horizontal profile of the atmospheric temperature, pressure, relative humidity and winds.

The first transceiver 18 is configured to receive the second weather source 46. The second weather source 46 may be provided by a drone and/or balloon. The drone may be autonomously driven or controlled. The drone includes an atmospheric sensor unit 48 configured to detect atmospheric conditions. The drone further includes a second transceiver configured to transmit the atmospheric conditions to the computer 12.

The local weather forecast application 16 is configured to transmit information from the setup tab 24, the first weather source 44 and the second weather source 46 to the weather model 16a. The weather model 16a is configured to generate a weather forecast 12 for the selected zone 14. In operation, the user enters information into the setup tab 24, and actuates the weather data application tab 26 wherein the weather data application 42 retrieves information from the first and second weather sources 44, 46.

The weather data application 42 may be a preprocessing system, instantiated currently as WPS and WRFDA, configured to process information from the first source to generate an enhanced analysis field. The enhanced analysis field is processed by the weather model 16a, currently instantiated as WRF, to generate an initial weather forecast. The weather model 16a further processes information from both or one of the second weather feed 46 and the sensor unit 48 to generate a local weather forecast 12. In such an alternative, the computer 12 transmits to the weather data application 42 the selected zone 14, period and location of the weather forecast.

Preferably the weather model 16a is a physics-based weather model. Any such weather model 16a currently known and used in the art may be adapted for use herein illustratively including the Weather Research and Forecasting (WRF) model. A cross-compiled version (allowing for execution on an Android OS-based handheld) of the weather model 16a may be downloaded onto the computer 12.

The weather forecast 12 may be displayed on tab labeled "PLOTS," as shown in FIG. 6. In particular, FIG. 4 shows a vertical profile of temperature and textual information regarding humidity, wind and precipitation for a region of interest over a one week period. Alternatively, the weather forecast 12 may be provided in text as shown in FIG. 7.

Figure 9:
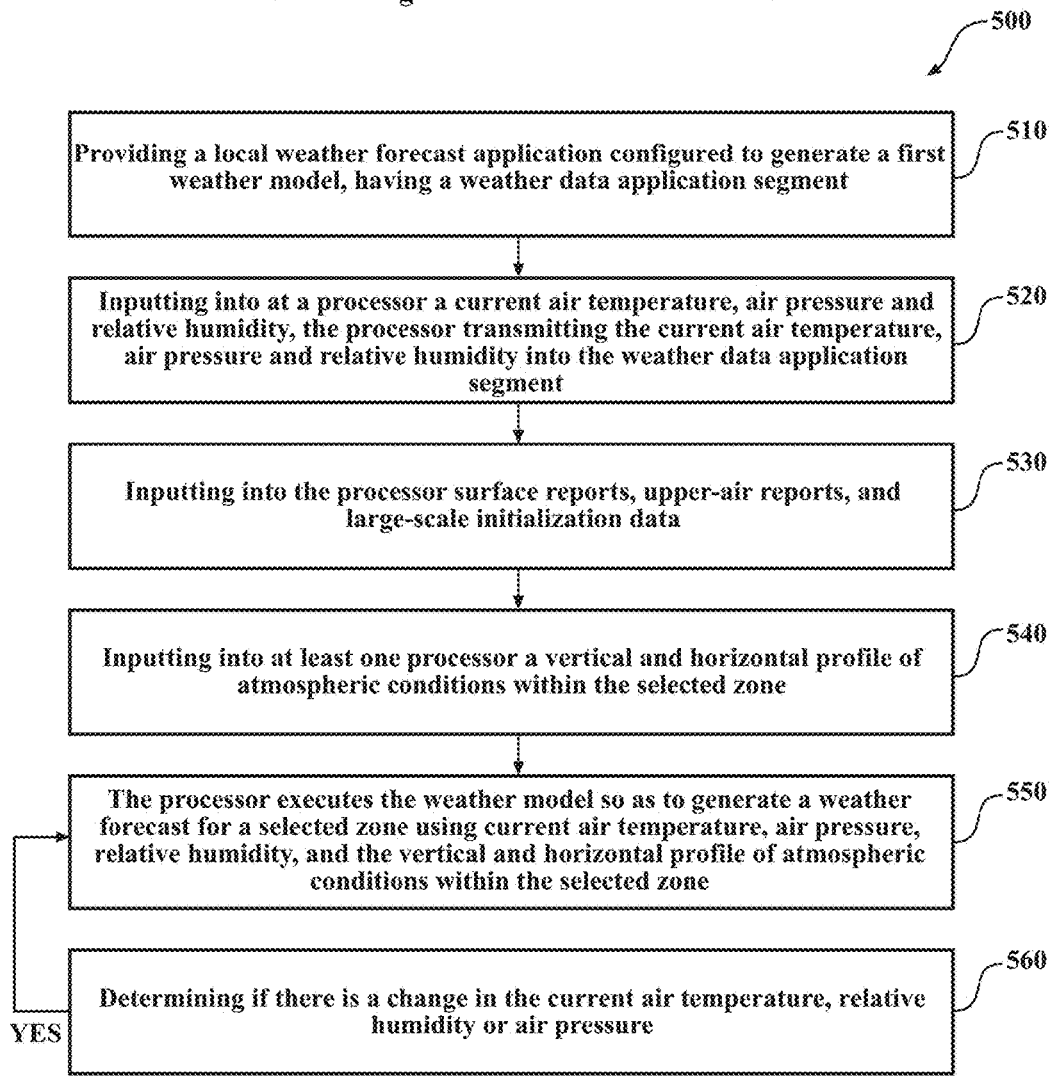
FIG. 9 a diagram showing the steps of a method for generating a weather forecast for a selected zone.

FIG. 9 is a diagram showing the steps of a method 500 for generating a weather forecast for a selected zone. It should be appreciated that the method shown in FIG. 9 should be viewed in conjunction with FIG. 2 or 3 which point out the components of the system 10. The method 500 is implemented on a computer having at least one processor. The computer includes the step of providing a local weather forecast application. The local weather forecast application is a programmable software executable by the processor. The local weather forecast application is written onto a memory unit of the computer.

The method includes step 510, providing the local weather forecast application. The local weather forecast application is configured to generate a first weather model. The local weather forecast application includes a weather data application segment configured to establish the geographic zone of the weather forecast. The weather data application segment includes a geographic input configured to select from one of a plurality of different sized zones.

The method proceeds to step 520, inputting into the at least one processor a current air temperature, air pressure and relative humidity. The at least one processor transmits the current air temperature, air pressure and relative humidity to the weather data application segment. The weather data application segment formats the information so as to be configured to be processed by the local weather forecast application.

The method includes step 530, inputting into at least one processor a surface report, upper-air report, and large-scale initialization data. (Note: at a minimum, the weather model requires large-scale initialization data but will produce much more accurate results if surface and upper-air reports are available). The large-scale initialization data may be provided by GFS and the local time, or a predetermined time may be used so as to retrieve the latest available large-scale initialization data. The surface report and upper-air report may be provided from the first weather feed. The method includes step 540, inputting into at least one processor a vertical and horizontal profile of atmospheric conditions within the selected zone. The method includes step 550, wherein the at least one processor executes the weather model so as to generate a weather forecast for a selected zone using current air temperature, air pressure, relative humidity, and the vertical and horizontal profile of atmospheric conditions within the selected zone.

The method may further include step 560, wherein the at least one processor determines if there is a change in the current air temperature, relative humidity or atmospheric pressure. As shown in FIG. 9, the processor further executes the weather model is as to dynamically update the weather forecast with any change to the air temperature, relative humidity or air pressure.

The vertical and horizontal profile of atmospheric conditions is the vertical and horizontal profile of the atmospheric temperature, pressure, relative humidity and winds. The vertical and horizontal profile of atmospheric conditions within the selected zone may be obtained using a drone.

It should be appreciated that the weather forecast may be adjusted in terms of geographic size and period. For example, the computer may include an input configured to select from one of a plurality of periods, or configured to manually enter a period. In such an embodiment, the method 500 may further include the step of inputting into at least one processor one of a plurality of periods of time for which the weather forecast may run, wherein the processor executes the weather model so as to generate a weather forecast for the selected period of time. Additionally, the method may further include the step of inputting into at least one processor the geographic location of the computer, wherein the processor executes the weather model so as to generate a weather forecast for the geographic location of the computer.

Figure 10:
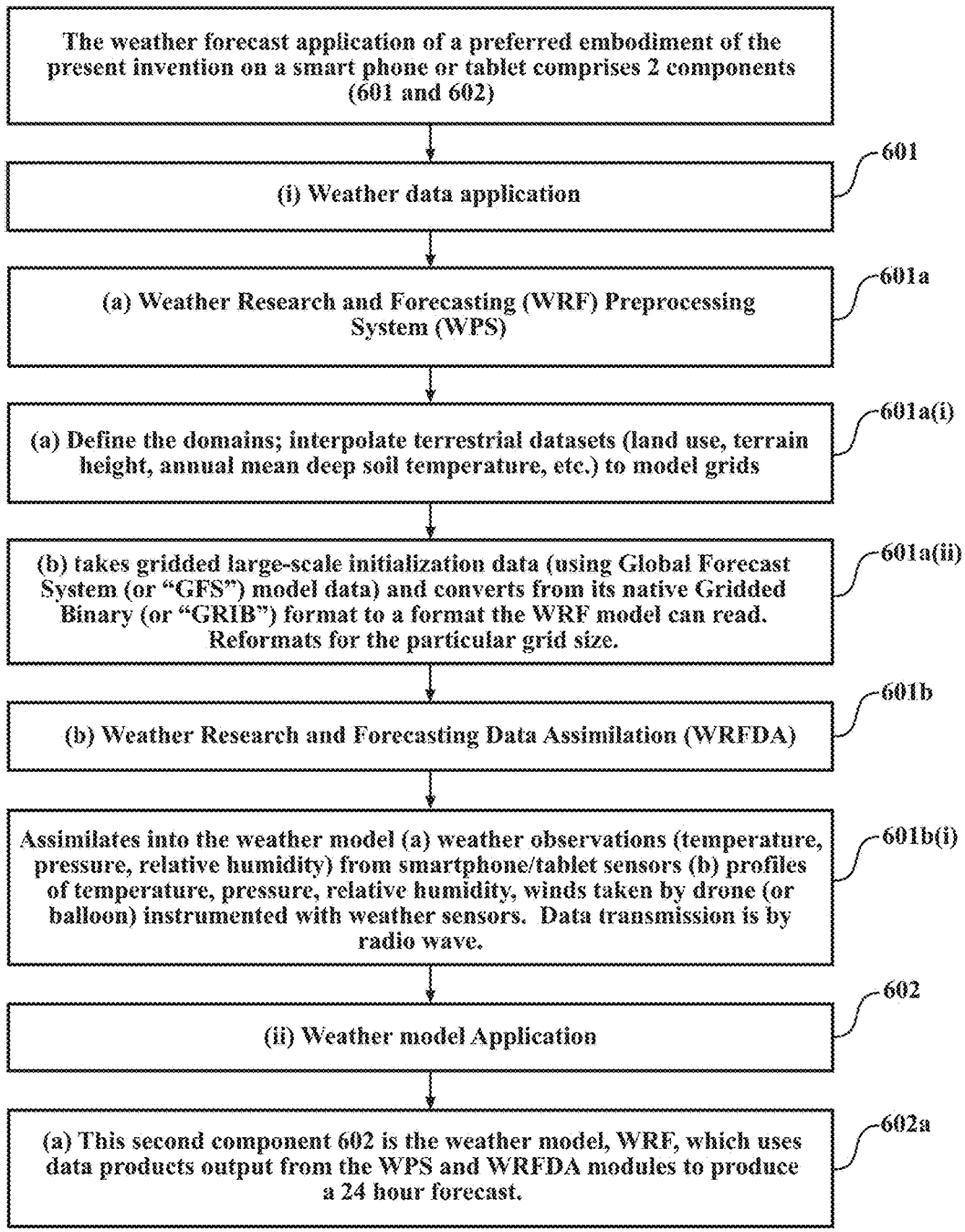
FIG. 10 is a diagrammatic overview of the software components of a preferred embodiment of the present invention.
Figure 11:
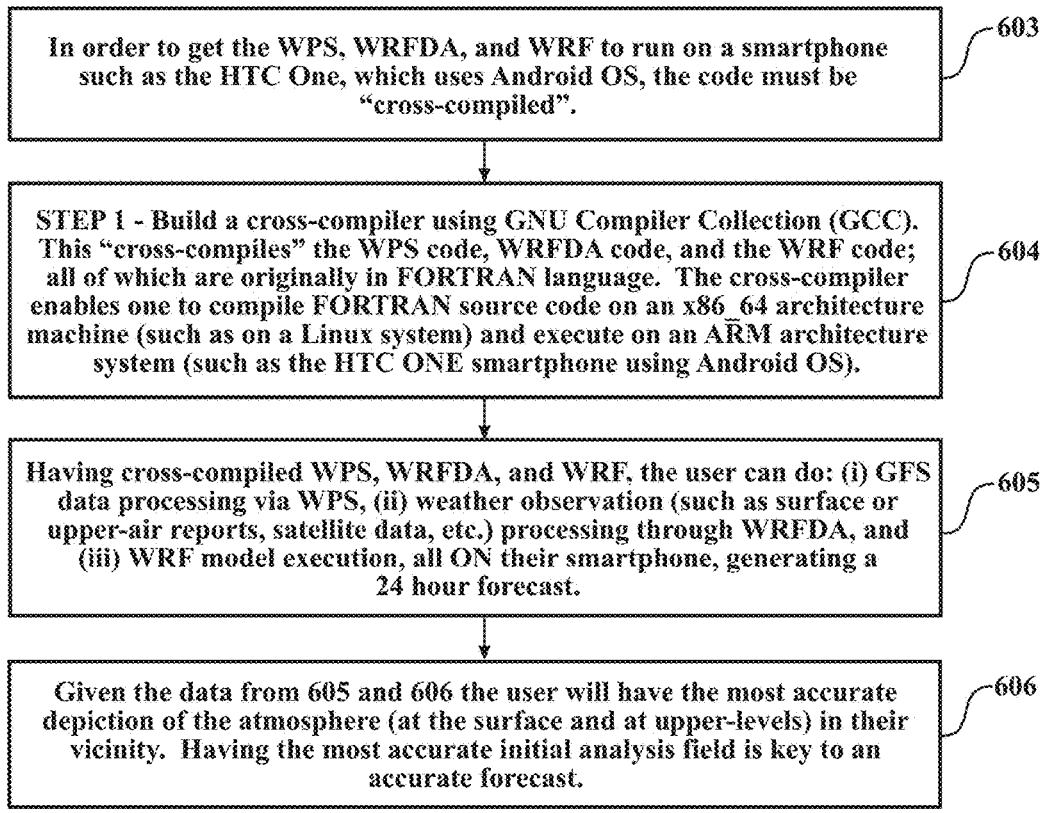
FIG. 11 is a diagrammatic overview of the programming technique and operation technique of a preferred embodiment of the present invention.
Figure 11:
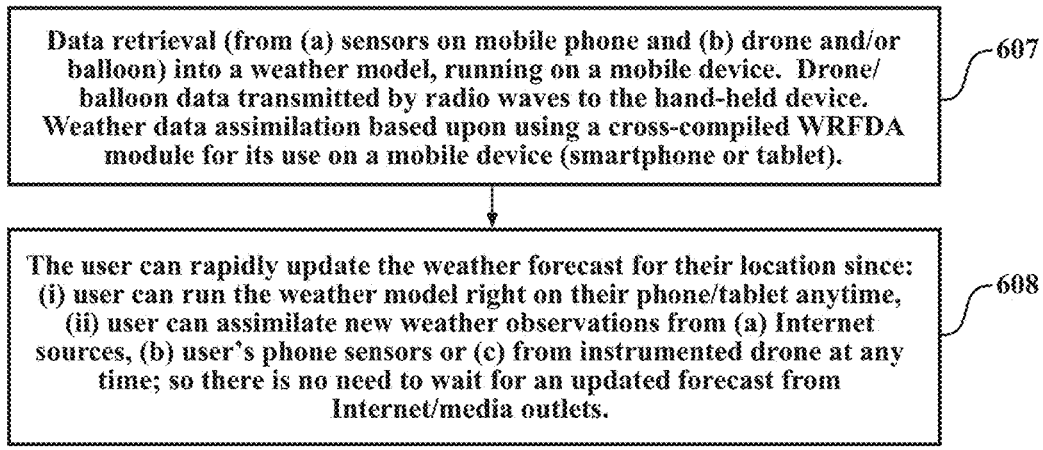

Referring now to box 601 of FIG. 10, the weather forecast application of a preferred embodiment of the present invention comprises 2 components 601 and 602. The first component 601 is the weather data application (i.e. the piece that transforms weather data, so that the WRF model can use it). Component 601 has 2 subparts. Subpart 601A is the Weather Research and Forecasting (WRF) Preprocessing System (or "WPS") which (i) takes geography data and reformats for the user grid as shown in block 601a(i) and (ii) takes gridded large-scale initialization data (using Global Forecast System (or "GFS") model data) and converts from its native Gridded Binary (or "GRIB") format to a format the WRF model can read. Reformats for the particular grid size, block 601a(ii). Subpart 601B is the Weather Research and Forecasting Data Assimilation (WRFDA) module. WRFDA assimilates surface, upper-air observations, satellite data, etc. into WRF model, as shown in block 601b(i).

The second component 602 is the weather model—using WRF. The details behind how WPS and WRF work are described above. As set forth in box 603, in order to get the WPS, the WRFDA and the WRF to run on a smartphone such as the HTC One, which uses Android OS, the code must be "cross-compiled." The first step is to build a cross-compiler (box 604) using GNU Compiler Collection (GCC). This allows "cross-compiling" of the WPS code, the WRFDA code, and the WRF code; all of which are in FORTRAN computer language. What this cross-compiler does is allow for compilation of FORTRAN source code on an x86_64 architecture machine (such as a Linux system), and execution on an ARM architecture system (such as the HTC One smartphone using Android OS). Having cross-compiled WPS, WRFDA, and WRF (box 605), one can process (i) GFS data using WPS, (ii) surface, upper-air, satellite, etc. observations using WRFDA, on the HTC One smartphone, then run the WRF model on the HTC One smartphone, generating 24 h of forecast output. A preferred embodiment of the present invention provides the capability of running a weather model (WRF or otherwise) on a smartphone (Android OS), based upon the cross-compiling of WPS, WRFDA, and WRF. As shown in box 607, a preferred embodiment of the present invention provides for the assimilating into the weather model running in the palm of a person's hand (smartphone or tablet): (a) weather observations (temperature, pressure, relative humidity) using smartphone sensors (b) profiles of temperature, pressure, relative humidity, winds taken by drone (or balloon also—but preferably a drone for the reusability aspect and there is no extensive setup as there is with a balloon); the drone is ideally run by user locally, but doesn't necessarily have to be if the user can access the data. A preferred embodiment builds this capability in hardware (instrumenting a small drone with weather sensors) and software. Given the data from (a) weather observations (temperature, pressure, relative humidity) using smartphone sensors and (b) profiles of temperature, pressure, relative humidity, winds taken by drone (or balloon) (box 608), the user will have an accurate depiction of the atmosphere (at the surface and at upper-levels) in their vicinity. Having the most accurate initial analysis field is key to a more accurate forecast.

A preferred embodiment of the present invention further comprises cross-compiling WRFDA for its use on a mobile device (smartphone or tablet) to provide data assimilation into a weather model, running on a mobile device. The user could rapidly update the weather forecast for their location since (i) they can run the weather model right on their phone/tablet anytime, (ii) they can assimilate new weather observations from (i) Internet sources, (ii) their phone sensors or (iii) from instrumented drone at any time. So there is no need to wait for an updated forecast from Internet/media outlets.

Figure 12:
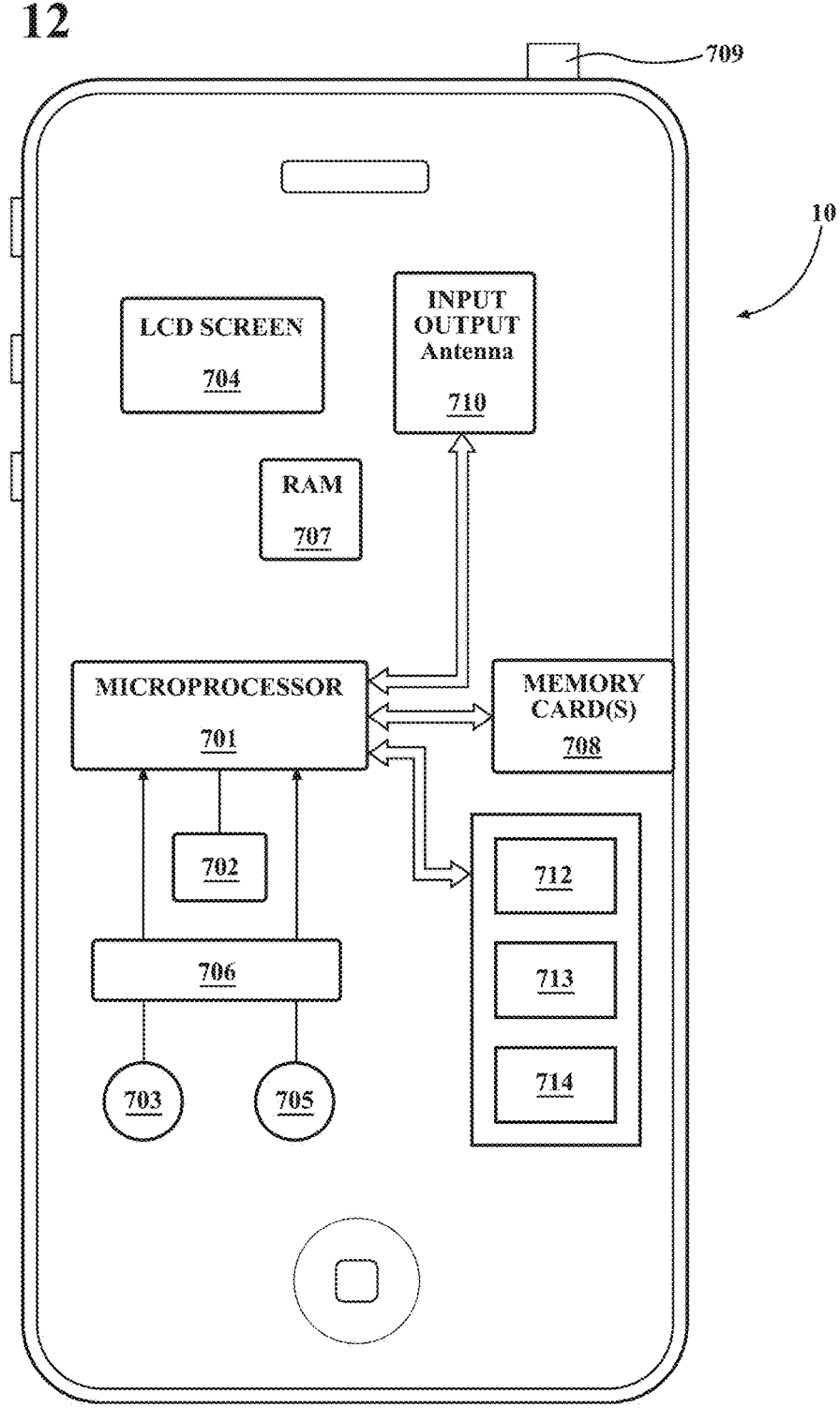
FIG. 12 is a schematic diagram of a preferred embodiment of the present invention.

Shown in FIG. 12 is a schematic diagram of a cell phone 10. Data is inputted into Microprocessor 701 through keypad 702 and microphone 703. Sensors 712, 713, and 714 record temperature, air pressure and humidity. The sensors 712, 713 and 714 transmit the recorded temperature, air pressure and humidity to the microprocessor. Analog to digital converter 706 processes data from both microphone 703 and speaker 705. Memory 707 connects to microprocessor 701, which may be a RAM or any conventional memory. Memory cards 708 may be inserted, such as SD, SIM cards or the like, from the exterior of the phone 10. The antenna 709 is connected to the cell phone 10 via the input/output circuitry 710. An LCD screen 704 displays data outputted by microprocessor 701.

Embodiments of the present invention may take a variety of forms and may be configured as a device (system) and/or method. The preferred embodiments may be formed or developed from combinations of hardware and software or entirely of hardware or software. The preferred embodiments described above may also take the form of a computer program product on a computer-readable storage medium having computer-readable program instructions (e.g., computer software) embodied in the storage medium. Such computer-readable storage mediums that may be utilized include magnetic storage devices, thumb drives, SD cards, hard disks, CD-ROMs, optical storage devices, or the like.

The block diagrams and flow chart illustrations described above, in the figures, and in the computer listings (attached as an appendix) may form part of methods, systems, and computer program products. Each block of the block diagrams and flowchart illustrations, and combinations of blocks in the block diagrams and flowchart illustrations represent a step or steps in computer program(s) that can be implemented by various means, The computer listings attached as an appendix and referred to above may be loaded onto a cellphone, smart phone, tablet or other programmable data processing apparatus, such as the processor discussed above to produce a machine, such that the instructions which execute on the cell phone, smart phone, laptop computer or other programmable data processing apparatus create a means for implementing the functions specified in the flowchart block or blocks.

The computer program instructions described above, in the figures, and in the computer listings (attached as an appendix) may also be stored in a computer-readable memory that can direct a computer, cell phone, tablet or other programmable data processing apparatus to function in a particular manner, such that the instructions stored in the computer-readable memory produce an article of manufacture containing computer-readable instructions for implementing the function specified in the flowchart block or blocks. The computer program instructions may also be loaded onto a smart phone or other programmable data processing apparatus to cause a series of operational steps to be performed on the cell phone or other programmable apparatus.

I claim:

1. A system configured to provide a weather forecast for a selected zone on a mobile cellphone or tablet, the system comprising:
   at least one processor for executing a local weather forecast application and a weather model, the local weather forecast application being an executable program having a weather data application, the weather data application configured to receive information from a first weather source, the first weather source providing surface reports, upper-air reports, and large-scale initialization data, the local weather data application further including a geographic input configured to select from one of a plurality of different sized zones, the weather model is configured to receive information from the first weather source and the geographic input, the at least one processor executing the weather model so as to generate the weather forecast; and a sensor unit positioned either external or internal to the mobile cellphone or tablet, configured to detect the air temperature, atmospheric pressure and relative humidity, the sensor unit transmitting the air temperature, atmospheric pressure and relative humidity to the weather model, the at least one processor further executing the weather model so as to process the surface reports, upper-air reports and large-scale initialization data from the first weather source and a selected zone from the geographic input and generate the weather forecast for the selected zone.

2. The device as set forth in claim 1, further including a forecast interval input, the forecast interval input having a plurality of forecast intervals for which the weather forecast may run, the at least one processor executing the weather model so as to process a selected forecast interval so as to generate a weather forecast for the selected forecast interval, and wherein then local weather forecast application is Weather and Research Forecasting Preprocessing System, and wherein the weather data application comprises Weather and Research Forecasting Preprocessing System and Weather Research and Forecasting Model Data Assimilation; and wherein the weather model is Weather Research and Forecasting Model; and wherein the first weather source is one of Meteorological Assimilation Data Ingest System (MADIS) or National Centers for Environmental Prediction (NCEP) Meteorological Data input; and wherein executing the weather model comprises executing the Weather Research and Forecasting Model while taking into account information provided by Weather Research and Forecasting Model Preprocessing System and Weather Research and Forecasting Model Data Assimilation.

3. The device as set forth in claim 2, further including a geographic locating unit configured to determine the geographic location of the device; the at least one processor executing the weather model so as to process the geographic location of the device when generating the weather model.

4. The device as set forth in claim 3, further including a display; wherein the at least one processor outputs the weather forecast on the display.

5. The device as set forth in claim 4, wherein the at least one processor is further configured to provide textual information relating to the weather output.

6. The device as set forth in claim 3, wherein the at least one processor executes the weather model so as to generate plots showing the weather forecast at one of a plurality of pressure levels.

7. The device as set forth in claim 3, wherein the at least one processor executes the weather model so as to generate weather plots.

8. The device as set forth in claim 3, wherein the at least one processor executes the weather model so as to generate cross-section plots indicating for example, temperature, winds, or humidity fields.

9. A computer implemented weather tracking method operable on at least one processor for generating a weather forecast for a selected zone, the method comprising:

providing a local weather forecast application configured to generate a weather model, having a weather data application; the weather data application further including a geographic input configured to select from one of a plurality of different sized zones, the local weather forecast application being an executable software program;

inputting into at least one processor a current air temperature, atmospheric pressure and relative humidity from at least one first sensor positioned on a drone or a balloon operating to sense air temperature, atmospheric pressure and relative humidity, the first sensor transmitting data by radio frequency transmission to the cellphone or tablet, and at least one second sensor positioned on the cellphone or tablet configured to input data relating to weather observations;

the at least one processor inputting the current air temperature, atmospheric pressure and relative humidity for use by the weather data application;

inputting into at least one processor surface reports, upper-air reports, and large-scale initialization data;

inputting into at least one processor a vertical and horizontal profile of atmospheric conditions within the selected zone, wherein the at least one processor executes the weather model so as to generate a weather forecast for a selected zone using current air temperature, atmospheric pressure, relative humidity, and the vertical and horizontal profile of atmospheric conditions within the selected zone.

10. The method as set forth in claim 9, further including the step of determining if there is a change in any one of the air temperature, atmospheric pressure and relative humidity, and transmitting to the at least one processor any change in the air temperature, atmospheric pressure and relative humidity so as to generate an updated weather forecast.

11. The method as set forth in claim 9, wherein the vertical and horizontal profile of atmospheric conditions is the vertical and horizontal profile of the atmospheric temperature, pressure, relative humidity and winds.

12. The method as set forth in claim 11, wherein the vertical and horizontal profile of atmospheric conditions within the selected zone is obtained by mounting the at least one first sensor on a drone or a balloon and transmitting the data by radio frequency transmission; and wherein the weather is tracked by integrating data from the at least one first sensors with the at least one second sensors to provide an accurate description of the atmosphere at the surface and upper levels in the vicinity.

13. The method as set forth in claim 12, further including the step of inputting into at least one processor one of a plurality of forecast intervals for which the weather forecast may run, the at least one processor executing the weather model so as to generate a weather forecast for the selected forecast interval.

14. The method as set forth in claim 13, further including the step of inputting into at least one processor the geographic location of the computer, the at least one processor executing the weather model so as to generate a weather forecast for the geographic location of the computer.

15. The system of claim 1 wherein the sensor unit comprises one of a drone or balloon controlled by the user comprising sensors configured to sense profiles of temperature, pressure, relative humidity, and winds; the drone or balloon transmitting to the at least one processor at radio frequency and further comprises cross-compiling Weather Research and Forecasting Data Assimilation (WRFDA) for its use on the at least one processor to provide data assimilation into the weather model running on the at least one processor, and wherein the user may rapidly update the weather forecast for a selected location since the user can run the weather model on the cellphone or tablet and can assimilate new weather observations from Internet sources or from the sensor unit; and wherein the system is configured to provide a weather forecast for a selected zone ranging in size from 400000 square kilometers to 600 square kilometers.

16. The system of claim 1 wherein the weather model is the Weather Research and Forecasting Model cross compiled to run on a smart phone using an Android operating system; and wherein the system predicts local weather changes using a cellphone or tablet using large-scale Global Forecast System initialization model grids.

17. A weather tracking system implemented on a cellphone or tablet for generating a local area weather forecast based upon data from at least one sensor unit and publicly available meteorological reports from one or both of the Meteorological Assimilation Data Ingest System or the National Centers for Environmental Prediction comprising:
at least one first sensor positioned on a drone or a balloon operating to sense air temperature, atmospheric pressure and relative humidity, the at least one first sensor transmitting data by radio frequency transmission to the cellphone or tablet, at least one second sensor positioned on the cellphone or tablet configured to input data relating to weather observations;
an input that receives and transforms weather data from one or both of the Meteorological Assimilation Data Ingest System or the National Centers for Environmental Prediction for input into a Weather Research and Forecasting Model;
at least one processor that operates a Weather Research and Forecasting Model Preprocessing System that takes geography data and reformats it for a user grid; and takes gridded large-scale initialization data from Global Forecast System model data and converts it from Gridded Binary format to a format that the Weather Research and Forecasting model can read;
the at least one processor configured to assimilate the air temperature, atmospheric pressure and relative humidity data from the at least one first and second sensors into a Weather Research and Forecasting model that creates a local weather forecast based upon the inputted weather data from one or both of the Meteorological Assimilation Data Ingest System or the National Centers for Environmental Prediction, the geography data, the predetermined grid size, and the air temperature, atmospheric pressure and relative humidity data from the at least one first and second sensors;
whereby due to the positioning of the first and second sensors the user may obtain an accurate depiction of the atmospheric conditions at the surface and upper-levels in the vicinity of the user.

18. The system of claim 17 wherein the Weather Research and Forecasting (WRF) model and WRF Data Assimilation which are written in FORTRAN are cross compiled in order to operate on an Android system of the at least one processor which enables the at least one processor to assimilate surface reports, upper-air reports, and satellite data into the WRF model; and wherein the forecast generated by weather models is enhanced by assimilating real time surface data from both the sensor unit and a first data source and upper air data from the first data source.

19. The system of claim 17 wherein the forecast takes into consideration local areas features such as topography and land use transitions and wherein weather is forecasted for a selected zone ranging in size from 400000 square kilometers to 600 square kilometers and wherein the at least one processor operates to assimilate into the weather model weather observations comprising temperature, pressure, relative humidity using the at least one second sensor, in conjunction with profiles of temperature, pressure, relative humidity, and winds taken by the at least one second sensor positioned on a drone or balloon and further comprising a geographic input that is a component of Weather and Research Forecasting Preprocessing System (WPS) which contains elevation data, and land use data, and is used to designate the model run area.

20. The system of claim 17 wherein the drone or balloon is controlled by a user locally and data is transmitted by radio waves to the smartphone or tablet and assimilated into weather model running on smartphone or tablet; the drone or balloon is instrumented with weather sensors and software and operates to produce profiles of temperature, pressure, relative humidity, winds as measured using a drone or balloon, and wherein local weather forecast application includes a weather data application component configured to receive data from a first weather source, the first weather source being one of the Meteorological Assimilation Data Ingest System (MADIS), or the National Centers for Environmental Prediction (NCEP), and wherein the first weather source provides surface reports, upper-air reports, and large-scale initialization data which covers a geographic area larger than the selected zone.

* * * * *